(12) United States Patent
Loehr et al.

(10) Patent No.: US 11,909,488 B2
(45) Date of Patent: Feb. 20, 2024

(54) SCELL BEAM FAILURE RECOVERY

(71) Applicant: Lenovo (Singapore) PTE. LTD., New Tech Park (SG)

(72) Inventors: Joachim Loehr, Wiesbaden (DE); Hyejung Jung, Northbrook, IL (US); Vijay Nangia, Woodridge, IL (US); Prateek Basu Mallick, Dreieich (DE); Ravi Kuchibhotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 240 days.

(21) Appl. No.: 17/279,567

(22) PCT Filed: Sep. 26, 2020

(86) PCT No.: PCT/IB2020/059026
§ 371 (c)(1),
(2) Date: Mar. 24, 2021

(87) PCT Pub. No.: WO2021/059245
PCT Pub. Date: Apr. 1, 2021

(65) Prior Publication Data
US 2022/0311498 A1    Sep. 29, 2022

Related U.S. Application Data

(60) Provisional application No. 62/906,576, filed on Sep. 26, 2019.

(51) Int. Cl.
*H04B 7/06* (2006.01)
*H04W 76/19* (2018.01)
(Continued)

(52) U.S. Cl.
CPC ........... *H04B 7/0695* (2013.01); *H04B 7/088* (2013.01); *H04L 1/1812* (2013.01);
(Continued)

(58) Field of Classification Search
CPC .... H04B 7/0695; H04W 76/19; H04W 72/23; H04W 72/1263; H04W 80/02; H04W 36/0033; H04W 72/1268; H04L 1/1812
See application file for complete search history.

(56) References Cited

U.S. PATENT DOCUMENTS

2021/0344405 A1* 11/2021 Yuan ..................... H04W 72/23
2022/0190900 A1*  6/2022 Berliner ............... H04W 72/21
2022/0352963 A1* 11/2022 Bai ..................... H04W 74/0833

OTHER PUBLICATIONS

Beam failure recovery for SCell Cedex, France, Jan. 20, 2019 (Year: 2019).*

(Continued)

*Primary Examiner* — Mewale A Ambaye
(74) *Attorney, Agent, or Firm* — Kunzler Bean & Adamson

(57) ABSTRACT

Apparatuses, methods, and systems are disclosed for SCell Beam Failure recovery. One apparatus includes a transceiver that communicates with a SCell in a wireless communication network. The apparatus includes a processor that receives a SR configuration from a wireless communication network, the SR configuration comprising a set of PUCCH resources, where the SR configuration corresponds to one or more logical channels. The processor detects that beam failure procedure has been triggered for the SCell. The processor triggers a scheduling request for SCell beam failure recovery in response to determining that there are no UL-SCH resources available for a new transmission for the transmission of a beam failure MAC CE. The processor transmits SR on the PUCCH resources of the SR configuration in response to triggering the scheduling request for SCell beam failure recovery.

20 Claims, 6 Drawing Sheets

(51) Int. Cl.
*H04B 7/08* (2006.01)
*H04L 1/1812* (2023.01)
*H04W 72/1263* (2023.01)
*H04W 72/23* (2023.01)
*H04W 80/02* (2009.01)

(52) U.S. Cl.
CPC ....... *H04W 72/1263* (2013.01); *H04W 72/23* (2023.01); *H04W 76/19* (2018.02); *H04W 80/02* (2013.01)

(56) References Cited

OTHER PUBLICATIONS

Discussion on SCell BFR Cedex, France 16 Aug. 16, 2019 (Year: 2019).*
Huawei, Hisilicon, "Beam failure recovery for Scell", 3GPP TSG RAN WG1 Ad-Hoc Meeting 1901 R1-1900846, Jan. 21-25, 2019, pp. 1-6.
OPPO, "Discussion on SCell BFR", 3GPP TSG-RAN WG2 Meeting #107 R2-1909673, Aug. 26-Aug. 30, 2019, pp. 1-3.
PCT/IB2020/059026, "International Search Report", PCT, dated Nov. 17, 2020, pp. 1-3.
3GPP, "3rd Generation Partnership Project; Technical Specification Group Radio Access Network; NR; Medium Access Control (MAC) protocol specification (Release 15)", 3GPP TS 38.321 V15.6.0, Jun. 2019, pp. 1-78.
Convida Wireless, "On Beam Failure Recovery for SCell", 3GPP TSG-RAN WG1 Ad-Hoc Meeting 1901 R1-1901206, Jan. 21-25, 2019, pp. 1-4.
3GPP, "3rd Generation Partnership Project; Technical Specification Group Radio Access Network; NR; Physical channels and modulation (Release 15)", 3GPP TS 38.211 V15.6.0, Jun. 2019, pp. 1-97.
TSG RAN WG2, "Reply LS on MAC CE design for SCell BFR", 3GPP TSG-RAN WG2 Meeting #107 R2-1911795, Aug. 26-30, 2019, pp. 1-1.
Samsung, "[Draft] Reply LS on MAC CE design for SCell BFR", 3GPP TSG-RAN WG2 Meeting #107 R2-1911747, Aug. 26-30, 2019, pp. 1-1.
PCT/IB2020/059026, "Written Opinion of the International Searching Authority", PCT, dated Nov. 17, 2020, pp. 1-8.

* cited by examiner

SCELL BEAM FAILURE RECOVERY

CROSS-REFERENCE TO RELATED APPLICATIONS

This application claims priority to U.S. Provisional Patent Application No. 62/906,576 entitled "Beam Failure Recovery Procedure for SCell" and filed on Sep. 26, 2019 for Joachim Loehr, Hyejung Jung, Vijay Nangia, Prateek Basu Mallick, and Ravi Kuchibhotla, which application is incorporated herein by reference.

FIELD

The subject matter disclosed herein relates generally to wireless communications and more particularly relates to efficient SCell Beam Failure recovery.

BACKGROUND

The following abbreviations are herewith defined, at least some of which are referred to within the following description: Third Generation Partnership Project ("3GPP"), Fifth Generation Core Network ("5GC"), Fifth Generation System ("5GS"), 5G QoS Indicator ("5QI"), Authentication, Authorization and Accounting ("AAA"), Positive-Acknowledgment ("ACK"), Application Function ("AF"), Access and Mobility Management Function ("AMF"), Antenna Panel ("AP"), Application Programming Interface ("API"), Access Stratum ("AS"), Base Station ("BS"), Buffer Status Report ("BSR"), Code Division Multiple Access ("CDMA"), Control Element ("CE"), Core Network ("CN"), Channel Quality Indicator ("CQI"), Channel State Information ("CSI"), CSI Reference Signal ("CSI-RS"), Dual Connectivity ("DC"), Downlink Control Information ("DCI"), Downlink ("DL"), Demodulation Reference Signal ("DM-RS"), Data Radio Bearer ("DRB"), Discontinuous Transmission ("DTX"), Enhanced Inter-cell Interference Coordination ("eICIC"), Evolved Node-B ("eNB"), Evolved Packet Core ("EPC"), Evolved Packet System ("EPS"), Evolved UMTS Terrestrial Radio Access ("E-UTRA"), Evolved UMTS Terrestrial Radio Access Network ("E-UTRAN"), European Telecommunications Standards Institute ("ETSI"), Guaranteed Bit Rate ("GBR"), New Generation (i.e., 5G) Node-B ("gNB"), Global Navigation Satellite System ("GNSS"), General Packet Radio Service ("GPRS"), Global Positioning System ("GPS"), Generic Public Service Identifier ("GPSI"), Global System for Mobile Communications ("GSM"), Hybrid Automatic Repeat Request ("HARQ"), Home Subscriber Server ("HSS"), Inter-cell Interference Coordination ("ICIC"), Identifier ("ID"), Information Element ("IE"), Industrial IoT ("IIOT"), Internet of Things ("IoT"), Key Performance Indicator ("KPI"), Layer-1 ("L1", also known as the Physical Layer), Layer 1 Identifier ("L1 ID"), Layer-2 ("L2", also known as the Link Layer), Layer 2 Identifier ("L2 ID"), Layer-3 ("L3", also known as the Network Layer), Logical Channel ("LCH"), LCH Prioritization ("LCP"), Long Term Evolution ("LTE"), Machine Learning ("ML"), Mobility Management ("MM"), Mobility Management Entity ("MME"), Negative-Acknowledgment ("NACK") or ("NAK"), Non-Access Stratum ("NAS"), New Generation Radio Access Network ("NG-RAN", a RAN used for 5GS networks), Neural Network ("NN"), Network Slice Selection Assistance Information ("NSSAI", e.g., a vector value including one or more S-NSSAI values), New Radio ("NR", a 5G radio access technology; also referred to as "5G NR"), Observed Time Difference Of Arrival ("OTDoA"), PC5 5QI ("PQI," corresponds to QoS for NR V2X communication over the PC5 interface), Packet Data Network ("PDN"), Packet Data Unit ("PDU", used in connection with 'PDU Session'), PC5 QoS Flow Indicator ("PFI"), Packet Data Network Gateway ("P-GW"), PC5 Link Identifier ("PLI"), Public Land Mobile Network ("PLMN"), Precoding Matrix Indicator ("PMI"), Physical Random Access Channel ("PRACH"), Physical Sidelink Control Channel ("PSCCH"), Physical Sidelink Shared Channel ("PSSCH"), QoS Flow Indicator ("QFI"), Quality of Experience ("QoE"), Quality of Service ("QoS"), Random Access Channel ("RACH"), Radio Access Network ("RAN"), Rank Indicator ("RI"), RAN Intelligent Controller ("RIC"), Radio Link Monitoring ("RLM"), Radio Network Information ("RNI"), RNI Service ("RNIS"), Radio Resource Management ("RRM"), Received Signal Received Power ("RSRP"), Received Signal Strength Indicator ("RSSI"), Receive ("RX"), Sidelink Control Information ("SCI"), Sidelink CSI RS ("S-CSI-RS"), Serving Gateway ("S-GW"), Signal-to-Interference-and-Noise Ratio ("SINR"), Sidelink ("SL"), Sidelink Reference Signal ("SL-RS"), Sidelink Synchronization Signal ("SLSS"), Sidelink Synchronization Signal Block ("SL-SSB"), Session Management ("SM"), Session Management Function ("SMF"), Single Network Slice Selection Assistance Information ("S-NSSAI"), Service Provider ("SP"), Semi-Persistent Scheduling ("SPS"), Sounding Reference Signal ("SRS"), Sidelink Received Signal Received Power ("S-RSRP"), Synchronization Signal ("SS"), Synchronization Signal Block ("SSB"), Transport Block ("TB"), Transmission Configuration Indicator ("TCI"), Time Difference of Arrival ("TDoA"), Transmit ("TX"), Uplink Control Information ("UCI"), Unified Data Management ("UDM"), User Data Repository ("UDR"), User Entity/Equipment (Mobile Terminal) ("UE"), Uplink ("UL"), Uplink Shared Channel ("UL-SCH"), User Plane ("UP"), Universal Mobile Telecommunications System ("UMTS"), UL Time Difference of Arrival ("UTDoA" or "U-TDoA"), UMTS Terrestrial Radio Access ("UTRA"), UMTS Terrestrial Radio Access Network ("UTRAN"), Vehicle-to-everything ("V2X", V2X communication encompasses both V2V and V2I), Vehicle-to-Infrastructure ("V2I"), Vehicle-to-Vehicle ("V2V"), a UE capable of vehicular communications using 3GPP protocols ("V2X UE"), and Worldwide Interoperability for Microwave Access ("WiMAX"). As used herein, "HARQ-ACK" refers to HARQ feedback may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

In certain wireless communication systems, Multiple-Input and Multiple-Output ("MIMO") techniques are used to improve data throughput. In 5G wireless communication systems, massive MIMO may be achieved by using beams-based cell-sector coverage where several narrow-beamwidth beams achieve coverage of the cell-sector in place of the single wide-beam used in previous generations. As the cell coverage is beams-based, a mobile terminal (UE) in the 5G cell will synchronize to, attach to and report from a beam. Under current 3GPP standards, the UE will only connect to a single beam. However, each beam in the massive MIMO system covers a limited area of the cell-sector and so Beam Failure ("BF") may occur, for example due to UE mobility or environmental conditions (e.g., radio shadow, interference, etc.).

BRIEF SUMMARY

Disclosed are procedures for SCell Beam Failure recovery. Said procedures may be implemented by apparatus, systems, methods, or computer program products.

One method of a UE includes receiving a SR configuration from a wireless communication network. Here, the SR configuration comprising a set of PUCCH resources, where the SR configuration corresponds to one or more logical channels. The method includes detecting that a beam failure recovery procedure has been triggered for a SCell in the wireless communication network. The method includes triggering a SR for SCell beam failure recovery in response to determining that there are no UL-SCH resources available for a new transmission for the transmission of a beam failure MAC CE. The method includes transmitting SR on the PUCCH resources of the SR configuration in response to triggering the SR for SCell beam failure recovery.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
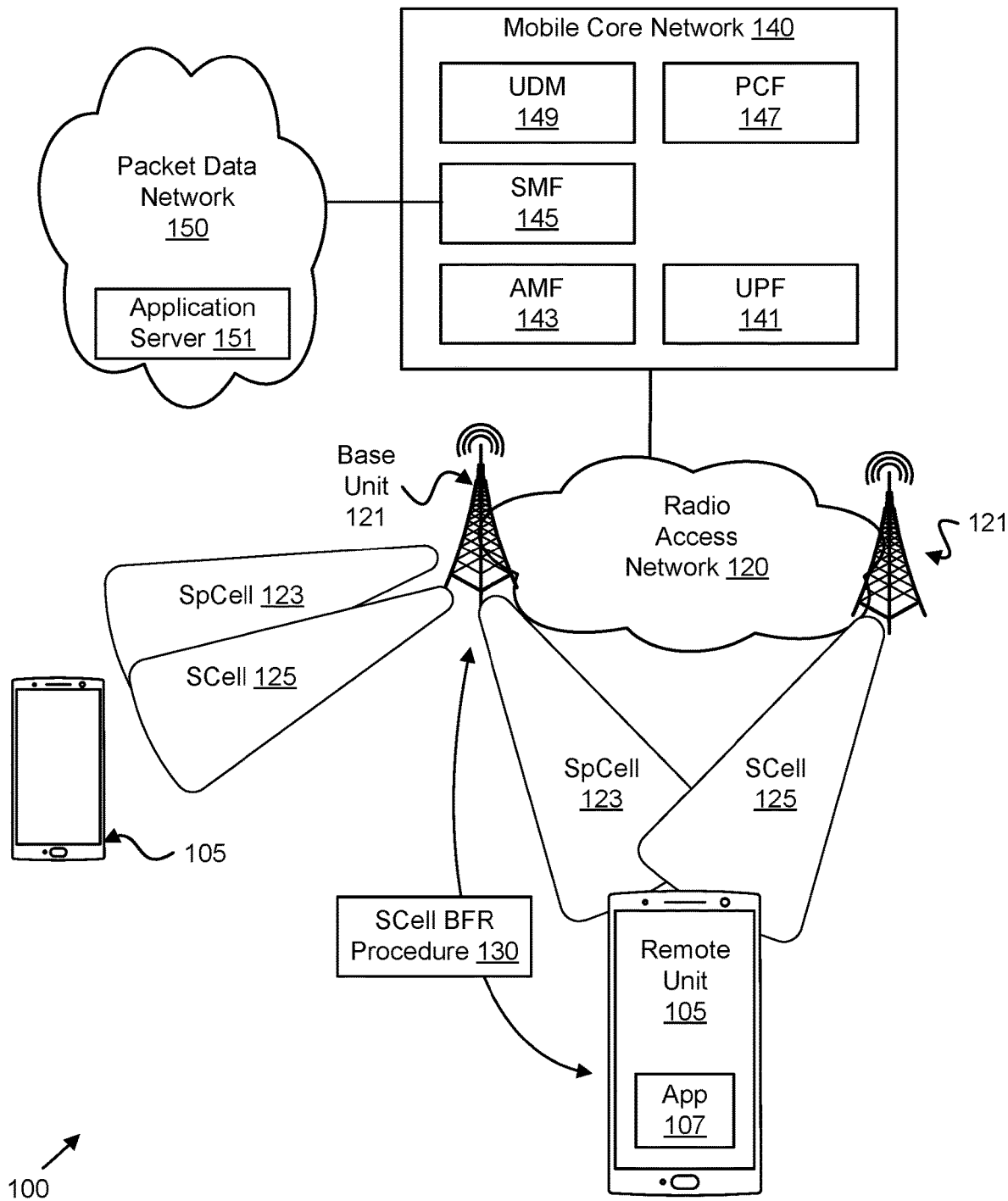
FIG. 1 is a schematic block diagram illustrating one embodiment of a wireless communication system for SCell Beam Failure recovery.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for beam failure recovery for a SCell. For BFR on SCell, the UE monitors the quality of an SCell. In case of declaring beam failure, the UE sends the beam failure recovery request (BFRQ) and sends failed SCell index(es) and new beam information (if present) to the network. Informing the network may be achieved using an SR resource on PUCCH for BFR. The BFR SR may be carried on the Primary Cell ("PCell") or a Primary Secondary Cell ("PSCell"). Additionally, the UE may send a MAC CE providing the network with information about a new beam (if present). Current 3GPP specifications do not restrict MAC CE transmission for BFR, i.e., in Rel-16 the UE can use UL grant of any serving cell for transmission of SCell BFR MAC CE.

However, the transmission of the SCell BFR MAC CE on a serving cell for which Beam Failure was declared might likely fail, e.g., the UE may most likely not receive UL grants/DCI on a serving cell with beam failure and hence no UL transmission will take place. However, the UE may be configured with UL "configured grant" (e.g., semi-static) resources in addition to dynamically scheduled uplink transmissions. The disclosure provides embodiments aiming to avoid transmitting the SCell BFR MAC CE on a serving cell which experienced a beam failure, thereby without introducing multiplexing restriction for the SCell BFR MAC CE.

According to the current agreements a SR-like dedicated PUCCH resource is introduced in order to request uplink resources for the transmission of the SCell BFR MAC CE. Furthermore, this SCell BFR PUCCH should have a higher priority than a normal (data-related) SR for cases when two SR/PUCCH are colliding. There might be cases where network did not configure the UE with SCell BFR PUCCH, in which case the UE may trigger the random access procedure in order to request UL resources for the transmission of the SCell BFR MAC CE. Because performing the RACH procedure—in particular a contention-based RACH procedure—will result in delaying the Beam Failure Recovery procedure (which is according to RAN1 agreements time critical), the disclosure provides some solutions avoiding the extra delay incurred by performing the RACH procedure for cases when UE is not configured SCell BFR PUCCH resources.

According to 3GPP Release 16 ("Rel-16"), the UE considers a SCell Beam Failure Recovery procedure successfully completed upon reception of an UL grant scheduling a new transmission for the HARQ process on which SCell BFR MAC CE was sent previously, i.e. thereby acknowledging the reception of the S Cell BFR MAC CE. One problem with this definition may arise for cases when the SCell BFR MAC CE was transmitted on a configured grant and—after the expiry of the associated configuredGrantTimer—UE erroneously considers the next CG occasion/UL grant as the response/acknowledgment for BFR even though the SCell BFR MAC CE was not received by the gNB, i.e. the NDI bit is considered as toggled for configured uplink grants if the corresponding configuredGrantTimer is not running. The disclosure provides some solution for avoiding the situation where UE erroneously the Beam Failure Recovery procedure as successfully completed.

Currently, there is no UE behavior defined for cases when the Beam Failure Recovery procedure was not successfully completed. The disclosure provides some well-defined UE behavior for the case that the BFR procedure was not successfully completed.

FIG. 1 depicts a wireless communication system 100 for SCell Beam Failure recovery for wireless devices, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links. Even though a specific number of remote units 105, base units 121, RANs 120, and mobile core networks 140 are depicted in FIG. 1, one of skill in the art will recognize that any number of remote units 105, base units 121, RANs 120, and mobile core networks 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the RAN 120 via uplink ("UL") and downlink ("DL") communication signals. Furthermore, the UL and DL communication signals may be carried over the wireless communication links. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the UPF 141. In order to establish the PDU session, the remote unit 105 must be registered with the mobile core network. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 121 may be distributed over a geographic region. In certain embodiments, a base unit 121 may also be referred to as an access terminal, an access point, a base, a base station, a Node-B, an eNB, a gNB, a Home Node-B, a relay node, a RAN node, or by any other terminology used in the art. The base units 121 are generally part of a radio access network ("RAN"), such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link. As depicted, a base unit 121 may support a special cell 123 (i.e., a PCell or PScell) and/or a SCell 125. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links. The wireless communication links may be any suitable carrier in licensed or unlicensed radio spectrum. The wireless communication links facilitate communication between one or more of the remote units 105 and/or one or more of the base units 121.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes one or more user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, and a Unified Data Management function ("UDM") 149. In various embodiments, the mobile core network 140 may also include an Authentication Server Function ("AUSF"), a Network Repository Function ("NRF") (used by the various NFs to discover and communicate with each other over APIs), a Network Exposure Function ("NEF"), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. Each network slice includes a set of CP and/or UP network functions. A network instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, a remote unit 105 may experience Beam Failure while in the coverage area of the base unit 121, wherein the remote unit 105 triggers a Beam Failure Recovery procedure 130. In certain embodiments, the remote unit 105 responds to Beam Failure by selectively ignoring received UL grants allocating resources, as discussed in further detail below. In certain embodiments, the remote unit 105 transmits a SCell Beam Failure Recovery ("BFR") MAC control element ("CE") for a SCell with Beam Failure according to an available dynamic UL grant without performing BFR scheduling request ("SR"), as discussed in further detail below. In certain embodiments, the remote unit 105 may use any valid SR Physical Uplink Control Channel ("PUCCH") resources configured for the remote unit 105 in case there is no valid PUCCH resource configured for the SCell BFR SR and the remote unit 105 has no available UL resources for the transmission of the BFR MAC CE, as discussed in further detail below.

In certain embodiments, the remote unit 105 is configured by the network which of the SR configurations being configured for data-related Buffer Status Report ("BSR") and/or SR triggering (referred to as "BSR/SR triggering"), e.g. SR configurations corresponding to a logical channel(s), to use for sending a SCell BFR SR, as discussed in further detail below. In certain embodiments, the remote unit 105 considers a SCell Beam Failure Recovery ("BLR") procedure successfully completed upon reception of a dynamic UL grant scheduling a new transmission for the HARQ process on which SCell BFR MAC CE was sent previously, as discussed in further detail below.

In certain embodiments, the remote unit 105 (re)triggers SCell BFR SR (if there is no available UL grant) or instructs the Multiplexing and Assembly procedure to generate the SCell BFR MAC CE (if there is an available UL grant) upon expiry of a SCell BFR timer, as discussed in further detail below. In certain embodiments, the remote unit 105 uses a conventional (logical channel related) SR configuration/ PUCCH resources configured for the remote unit 105 on the Special Cell ("SpCell") to transmit the BFR SR (if SR is configured on the SpCell) or performs a random access ("RACH") procedure on the SpCell (if SR is not configured on the SpCell), as discussed in further detail below.

While FIG. 1 depicts components of a 5G RAN and a 5G core network, the described embodiments for beam failure recovery for a SCell apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 maps to an HSS, etc.

In the following descriptions, the term "RAN Node" is used for the base station but it is replaceable by any other radio access node, e.g., gNB, eNB, BS, AP, NR, etc. Further the operations are described mainly in the context of 5G NR. However, the proposed solutions/methods are also equally applicable to other mobile communication systems supporting beamforming and/or beams-based cell-sectors.

Figure 2:
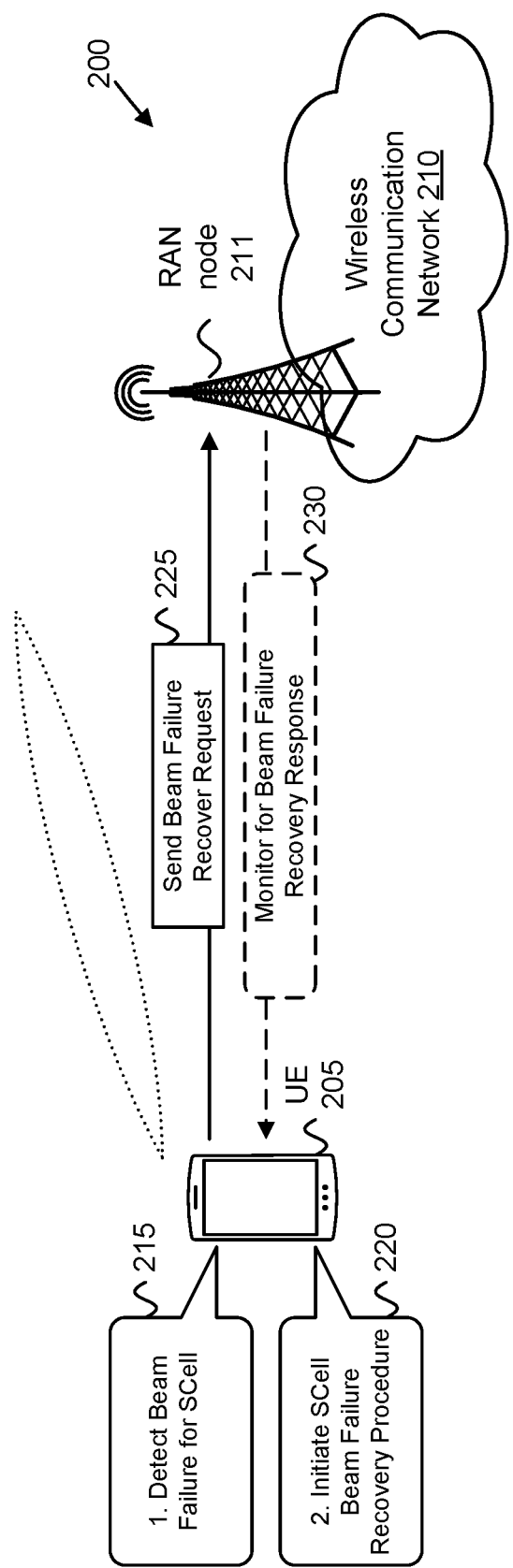
FIG. 2 is a diagram illustrating one embodiment of beam failure recovery for a SCell.

FIG. 2 depicts a recovery procedure 200 between a UE 205 and a RAN node 211 in a wireless communication network 210. Note that the UE 205 may be one embodiment of the remote unit 105, described above. Likewise, the wireless communication network 210 may be an embodiment of the RAN 120 and mobile core network 140, described above. While the specific cells are not shown in FIG. 2, it is assumed that the UE 205 communicates with the wireless communication network 210 using a primary cell (e.g., at least one cell from a primary cell group or master cell group) and at least one secondary cell (e.g., one or more secondary cells from the primary/master cell group and/or from a secondary cell group).

During the procedure 200, the UE 205 experiences Beam Failure for a Secondary Cell ("SCell") 125 provided by the RAN node 211. Initially, the UE 205 detects Beam Failure for the SCell (see block 215) and triggers a SCell Beam Failure Recovery procedure (see block 220). Various solutions for SCell Beam Failure Recovery ("BFR") are described below. In the depicted embodiment, the UE 205 sends a beam failure recover request to the RAN node 211 (see messaging 225). In one embodiment, the beam failure recover request may trigger the transmission of a SR sent according to a SR configuration. In another embodiment, the beam failure recover request may be a MAC CE sent using a UL-SCH resource. In certain embodiments, the UE 205 optionally monitors for a BFR response from the RAN node 211 (see block/messaging 230).

Figure 3:
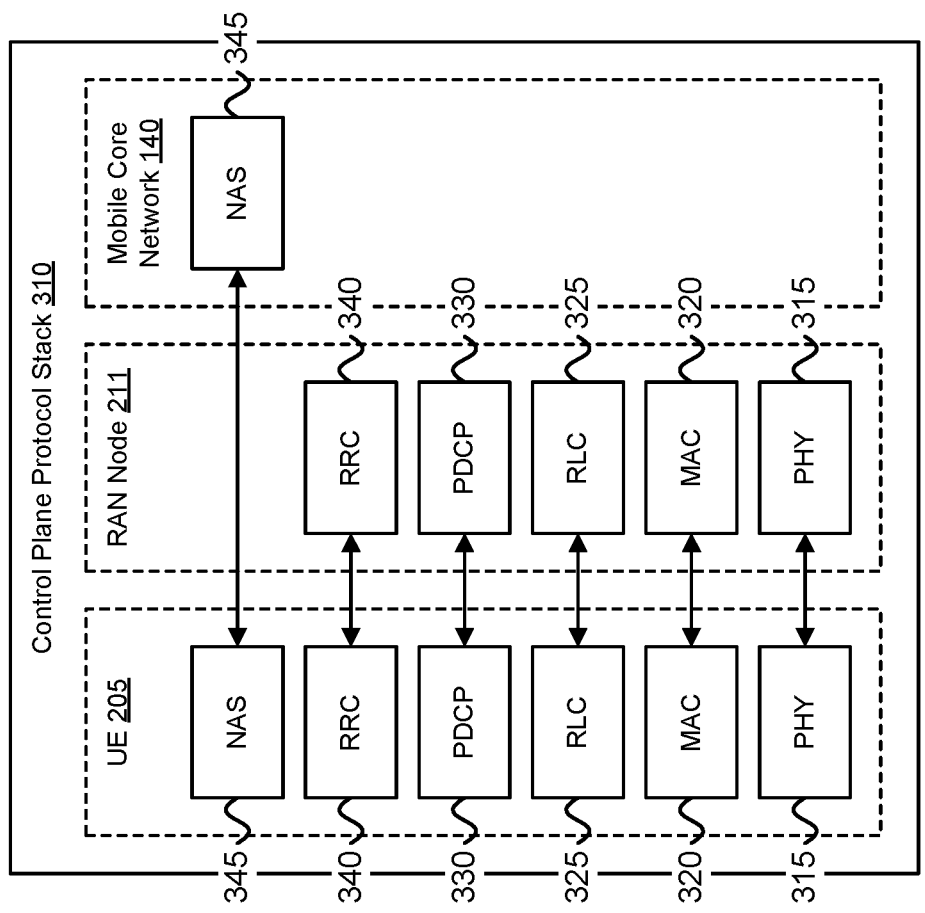
FIG. 3 is a diagram illustrating one embodiment of a protocol stack.
Figure 3:
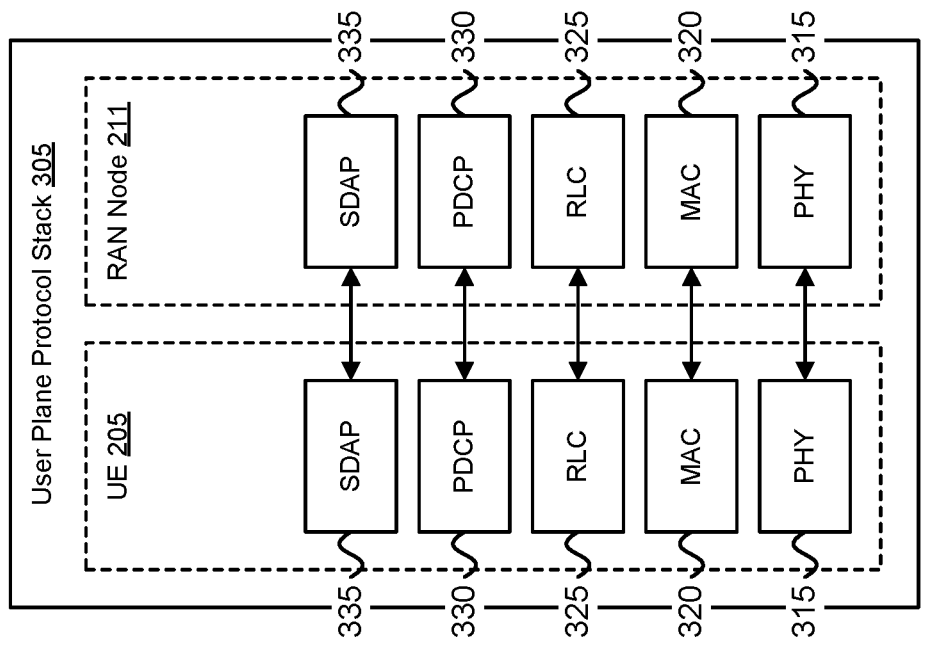

FIG. 3 depicts a protocol stack 300, according to embodiments of the disclosure. While FIG. 3 shows the UE 205, the RAN node 211 and the mobile core network 140, these are representative of a set of remote units 105 interacting with a base unit 121 and a mobile core network 140. As depicted, the protocol stack 300 comprises a User Plane protocol stack 305 and a Control Plane protocol stack 310. The User Plane protocol stack 305 includes a physical ("PHY") layer 315, a Medium Access Control ("MAC") sublayer 320, a Radio Link Control ("RLC") sublayer 325, a Packet Data Convergence Protocol ("PDCP") sublayer 330, and Service Data Adaptation Protocol ("SDAP") layer 335. The Control Plane protocol stack 310 also includes a physical layer 315, a MAC sublayer 320, a RLC sublayer 325, and a PDCP sublayer 330. The Control Place protocol stack 310 also includes a Radio Resource Control ("RRC") layer and a Non-Access Stratum ("NAS") layer 345.

The AS protocol stack for the Control Plane protocol stack 310 consists of at least RRC, PDCP, RLC and MAC sublayers, and the physical layer. The AS protocol stack for the User Plane protocol stack 305 consists of at least SDAP, PDCP, RLC and MAC sublayers, and the physical layer. The Layer-2 ("L2") is split into the SDAP, PDCP, RLC and MAC sublayers. The Layer-3 ("L3") includes the RRC sublayer 340 and the NAS layer 345 for the control plane and includes, e.g., an Internet Protocol ("IP") layer or PDU Layer (note depicted) for the user plane. L1 and L2 are referred to as "lower layers", while L3 and above (e.g., transport layer, application layer) are referred to as "higher layers" or "upper layers".

The physical layer 315 offers transport channels to the MAC sublayer 320. The MAC sublayer 320 offers logical channels to the RLC sublayer 325. The RLC sublayer 325 offers RLC channels to the PDCP sublayer 330. The PDCP sublayer 330 offers radio bearers to the SDAP sublayer 335 and/or RRC layer 340. The SDAP sublayer 335 offers QoS flows to the mobile core network 140 (e.g., 5GC). The RRC layer 340 provides for the addition, modification, and release of Carrier Aggregation and/or Dual Connectivity. The RRC layer 340 also manages the establishment, configuration, maintenance, and release of Signaling Radio Bearers ("SRBs") and Data Radio Bearers ("DRBs"). In certain embodiments, a RRC entity functions for detection of and recovery from radio link failure.

According to a first solution, the UE 205 ignores received uplink grants allocating uplink resources on a SCell 125 for which: 1) Beam Failure was detected/declared or 2) a Beam Failure Recovery procedure was initiated and not successfully completed. According to one implementation of the first solution, the UE 205 autonomously (i.e., acting without explicit signaling or instruction from the RAN node 211) deactivates or clears any configured uplink grants. Additionally, the UE 205 may also clear any PUSCH resources for semi-persistent CSI reporting for a SCell 125 when: 1) Beam Failure was detected or 2) Beam Failure Recovery procedure was initiated for that SCell 125. In some embodiments, the UE 205 may also stop transmission on PUCCH if the SCell 125 is configured with PUCCH. Similarly, the UE 205 may also stop SRS transmission except possibly for SRS in a resource set with usage set to 'beamManagement'.

In one implementation of the first solution, the UE 205 (specifically a MAC entity at the MAC layer 320 of the UE 205), stops uplink transmissions for a SCell 125 upon initiating Beam Failure Recovery procedure for that SCell 125 and considers the timeAlignmentTimer (TAT) associated with the SCell 125 as expired. By stopping UL transmissions on a SCell 125 for which the Beam Failure Recovery procedure was initiated and thereby ensuring not to transmit the SCell BFR MAC CE on a SCell 125 experiencing a Beam Failure, a transmission failure of the SCell BFR MAC CE and consequently delayed Beam Failure Recovery procedure is avoided.

In one embodiment of the first solution, stopping UL transmissions on a SCell 125 for which the Beam Failure Recovery procedure was initiated may be achieved by considering the timeAlignmentTimer associated with that SCell 125 as expired. For example, 3GPP TS 38.321, section 5.2 may be modified to specify that "When the MAC entity stops uplink transmission for a SCell due to the fact that a Beam Failure Recovery procedure was initiated for that SCell, the MAC entity considers the timeAlignmentTimer associated with the SCell as expired." "When the MAC entity stops uplink transmissions for an SCell due to the fact that the maximum uplink transmission timing difference between Timing Advance Groups ("TAGs") of the MAC entity or the maximum uplink transmission timing difference between TAGs of any MAC entity of the UE is exceeded, the MAC entity considers the timeAlignmentTimer associated with the SCell as expired. Note that a TAG refers to includes one or more serving cells with the same UL timing advance and the same DL timing reference cell. If a TAG contains the PCell, it is referred to as Primary Timing Advance Group ("pTAG"). If a TAG contains only SCell(s), it is referred to as Secondary Timing Advance Group ("sTAG").

Additionally, when the MAC entity stops uplink transmission for a SCell 125 due to the fact that a Beam Failure Recovery procedure was initiated for that SCell 125, the MAC entity considers the timeAlignmentTimer associated with the SCell as expired. Note that the MAC entity is not to perform any uplink transmission on a Serving Cell except the Random Access Preamble transmission when the timeAlignmentTimer associated with the TAG to which this Serving Cell belongs is not running. Furthermore, when the timeAlignmentTimer associated with the Primary Timing Advance Group is not running, the MAC entity is not to perform any uplink transmission on any Serving Cell except the Random Access Preamble transmission on the SpCell.

According to a second solution, the UE 205 may transmit a SCell BFR MAC CE for a SCell with Beam Failure according to an available dynamic UL grant without performing BFR SR if the available dynamic UL grant is on a SpCell. However, if there is no available UL grant on the SpCell, then the UE 205 may perform BFR SR (e.g., if BFR SR PUCCH is configured) or perform a RACH procedure on the SpCell (e.g., if BFR SR PUCCH is not configured). The UE 205 then waits for an UL grant on the SpCell.

In certain embodiments, the SCell BFR MAC CE may be prioritized over user-plane data to expedite beam recovery in the SCell 125. For example, if the UE 205 is in a transmit-power limited state and accordingly has to apply power scaling to a lower priority uplink transmission, then a PUSCH transmission on a SpCell 123 is prioritized over a PUSCH transmission on a SCell 125 within a given cell group (e.g. MCG or SCG). Thus, dropping of a PUSCH transmission including the SCell BFR MAC CE can be minimized by including the BFR MAC CE only in a PUSCH of the SpCell 123 and restricting not to multiplex the SCell BFR MAC CE in a PUSCH of the SCell (where the SCell 125 is any SCell in the cell group).

As used herein, a master node refers to the RAN node 211 that provides the control plane connection to the core network 140, e.g., in case of dual connectivity ("DC"). A RAN node 211 with no control plane connection to the core network 140, but providing additional resources to the UE 205 (e.g., in the case of DC) is referred to as a "secondary node". Note that serving cells may be grouped together into one or more cell groups. A group of serving cells associated with the master node is referred to as a "master cell group" or "MCG". The MCG contains the PCell and optionally one or more SCells. A secondary cell group ("SCG") refers to a group of serving cells associated with the secondary node, comprising of the SpCell 123 (e.g., PSCell) and optionally one or more SCells.

Under MCG, there may be many Cells, one of which is used to initiate initial access. This cell is called PCell. Note that a PCell and an SCell in the MCG may be used together by Carrier Aggregation ("CA") technology. The PSCell the "main" cell of the SCG and is the cell for initial access under the SCG. Note that the PSCell and an SCell in the SCG may be used together under CA. The SpCell 123 refers to the PCell and/or the PSCell.

In one implementation of the second solution, if the UE 205 is power-limited (i.e., if a total UE transmit power for a PUSCH or PUCCH or PRACH or SRS transmission in a respective transmission occasion i would exceed the configured maximum power, Pcmax(i)), then—from a power allocation perspective—a PUSCH with BFR MAC-CE has the highest priority except for PRACH transmission on PCell. As such, the priority order (in descending order) can be: PRACH transmission on PCell>PUSCH with BFR MAC-CE>PUCCH with at HARQ-ACK/SR or PUSCH with HARQ-ACK>PUCCH/PUSCH with CSI>PUSCH without HARQ-ACK/CSI>aperiodic SRS>periodic/semi-persistent SRS or PRACH on SCell.

In another example, PUCCH/PUSCH with HARQ-ACK may have higher priority than PUSCH with BFR MAC-CE. Here, the priority order (in descending order) may be: PRACH transmission on PCell>PUCCH/PUSCH with HARQ-ACK>PUSCH with BFR MAC-CE>PUCCH transmission with SR only>PUCCH/PUSCH with CSI>PUSCH without HARQ-ACK/CSI>aperiodic SRS>periodic/semi-persistent SRS or PRACH on SCell. According to yet another alternative UE may—when being power-limited—prioritize PUSCH with BFR MAC CE over a PRACH transmission on PCell, i.e. PUSCH with BFR MAC having the highest priority in the priority order.

According to a third solution, the UE 205 may use any valid SR PUCCH resources configured for the UE 205 in case there is no valid PUCCH resource configured for the SCell BFR SR and the UE 205 has no available UL resources for the transmission of the BFR MAC CE. In one implementation of the third solution, the UE 205 may use any valid SR PUCCH resources configured for the UE 205 in case the UE 205 has no BFR SR configuration. In various embodiments, a BFR SR configuration includes a set of PUCCH resources for SCell Beam Failure Recovery Request ("BFRQ").

In one implementation of the third solution, the UE 205 uses the SR configuration providing the earliest available PUCCH resources for cases when the UE 205 has no valid PUCCH resources for BFR SR. Alternatively, the UE 205 may use some PUCCH resources of some preconfigured SR configuration, e.g., SR configuration associated with a URLLC LCH, for cases when the UE 205 is not configured with a BFR SR configuration. Beneficially, using one of the configured "conventional" (data-related) SR configurations, i.e., SR configuration associated with some LCH, rather than using a random access procedure for requesting UL resources will speed up the Beam Failure Recovery Request procedure for cases when the UE 205 has no BFR SR configuration and no available UL grant to send the BFR MAC CE.

It should be noted that the transmission of BFR SR/MAC CE is time critical. According to one implementation of the third solution, the UE 205 behavior for cases when SCell BFR SR has been triggered and the UE 205 has no available UL-SCH resources is as follows: If there are valid PUCCH resources configured for the BFR SR, then the UE 205 uses those PUCCH resources for requesting PUSCH resources. However, if there are no valid PUCCH resources configured for BFR SR, then the UE 205 may use any other valid PUCCH resource configured for SR for requesting PUSCH resources. For cases when the UE 205 does not have any valid PUCCH resources, then the UE 205 initiates the RACH procedure to request PUSCH resources.

In one implementation of the third solution, when the UE 205 has a valid PUCCH resource (BFR SR PUCCH resource, or any other valid PUCCH resource configured for SR) and available UL-SCH resources that start after the start of the valid PUCCH resource), the UE 205 selects whether to transmit PUCCH or PUSCH corresponding to the available UL-SCH depending on the time gap between the start of the valid PUCCH resource and start of the PUSCH. In one example, if the time gap is greater than a threshold then the UE 205 transmit the PUCCH, otherwise the UE 205 transmit PUSCH with BFR MAC CE. In one example, the time gap threshold may be based on the UL HARQ RTT timer or configured by higher layers. The available UL-SCH resource may correspond to a valid PUSCH associated with a UL grant that is received at least a certain time interval or cut-off time before the start of the valid PUCCH resource. The cut-off time may be related to the CSI processing time or configured by higher layers.

According to a fourth solution, the UE 205 is configured by the network which of the SR configurations being configured for data-related BSR/SR triggering, e.g., SR configurations corresponding to a logical channel(s), to use for sending a SCell BFR SR. According to one implementation of the fourth solution, the BFR SR may be mapped to a SR configuration to which a logical channel may be also mapped to, i.e., the SR configuration corresponds to one or more LCHs and a SCell BFR SR. Beneficially, the need for having a separate SR configuration just for the purpose of SCell BFR SR is avoided, by allowing to map a logical channel as well as SCell BFR SR to a SR configuration. Accordingly, the SCell BFR SR may be treated like a virtual LCH from a configuration perspective. Note here that the fourth solution may be treated as an extension to the third solution.

According to a fifth solution, the UE 205 considers a SCell Beam Failure Recovery procedure successfully completed upon reception of a dynamic UL grant scheduling a new transmission for the HARQ process on which SCell BFR MAC CE was sent previously. In one implementation of the fifth solution, the UE 205 is restricted to send the SCell BFR MAC CE only on UL-SCH resources allocated by a dynamic UL grant, i.e. the UE 205 is not allowed to send a SCell BFR MAC CE on a configured grant resource. By introducing such restriction, a situation is avoided where the UE 205 has an UL grant for a HARQ process on which the SCell BFR MAC CE was sent indicating a new transmission (after configuredGrantTimer expiry) even though the UL transmission containing the SCell BFR MAC CE was not received by the RAN node 211. Therefore, criteria for successful completion of a SCell Beam Failure Recovery procedure is the reception of a dynamic UL grant, e.g., PDCCH/DCI addressed to the C-RNTI, indicating a new transmission, i.e. toggled NDI.

According to a sixth solution, the UE 205 (re)triggers SCell BFR SR (if there is no available UL grant) or instructs the Multiplexing and Assembly procedure to generate the SCell BFR MAC CE (if there is an available UL grant) upon expiry of a SCell BFR timer. Such new timer—referred to as "SCell BFR timer"—defines the time period during which the UE 205 monitors for the reception of the BFR response message, e.g., UL grant indicating a new transmission for the HARQ process on which the SCell BFR MAC CE was transmitted. In various embodiments, the UE 205 starts the SCell BFR timer and may restart the SCell BFR timer at each HARQ retransmission in the first symbol after the end of the SCell BFR MAC CE transmission or in the first symbol after the end of the SCell BFR SR transmission. While the SCell BFR timer is running, the UE 205 is in DRX Active Time, according to one implementation of the sixth solution.

According to a seventh solution, a BFR SR configuration including a PUCCH resource for SCell Beam Failure Recover Request ("BFRQ") and parameters related to a SCell BFR SR procedure can be configured on a SpCell 123 or a PUCCH SCell (i.e. an SCell configured with the RRC parameter 'PUCCH-Config'). In one implementation, the parameters related to the SCell BFR SR procedure include 'bfr-sr-ProhibitTimer' and 'bfr-sr-TransMax', where the UE 205 starts the bfr-sr-ProhibitTimer within a MAC entity of the UE 205 instructing a physical layer of the UE 205 to signal the BFR SR on one valid PUCCH resource for BFR SR and bfr-sr-TransMax is the maximum number of BFR SR transmissions for a given BFR SR procedure. Note here that the seventh solution may be treated as an extension to the sixth solution.

According to an eighth solution, if a the UE 205 receives a BFR SR configuration configuring PUCCH resources not on a SpCell 123, but on a PUCCH SCell (e.g. for PUCCH load balancing across cells) and the number of BFR SR transmissions on the PUCCH SCell reaches to the maximum allowed BFR SR transmissions (i.e. the value of bfr-sr-TransMax), then the UE 205 uses a conventional (logical channel related) SR configuration/PUCCH resources configured for the UE 205 on the SpCell 123 to transmit the BFR SR (i.e., if SR is configured on the SpCell 123) or performs a random access procedure on the SpCell 123 (i.e., if SR is not configured on the SpCell 123). In one implementation of the eighth solution, the random access procedure on the SpCell 123 is a contention-based random access. In another implementation of the eighth solution, the UE 205 is configured with a dedicated PRACH preamble for the BFR SR.

According to a ninth solution, for cases when the UE 205 transmits a conventional (LCH-related) SR on the SpCell 123 and a SCell BFR SR on the PUCCH SCell in overlapped time duration, the UE 205 prioritizes a PUCCH including the conventional SR on the SpCell 123 over a PUCCH including the BFR SR on the PUCCH SCell, e.g. for power scaling.

Figure 4:
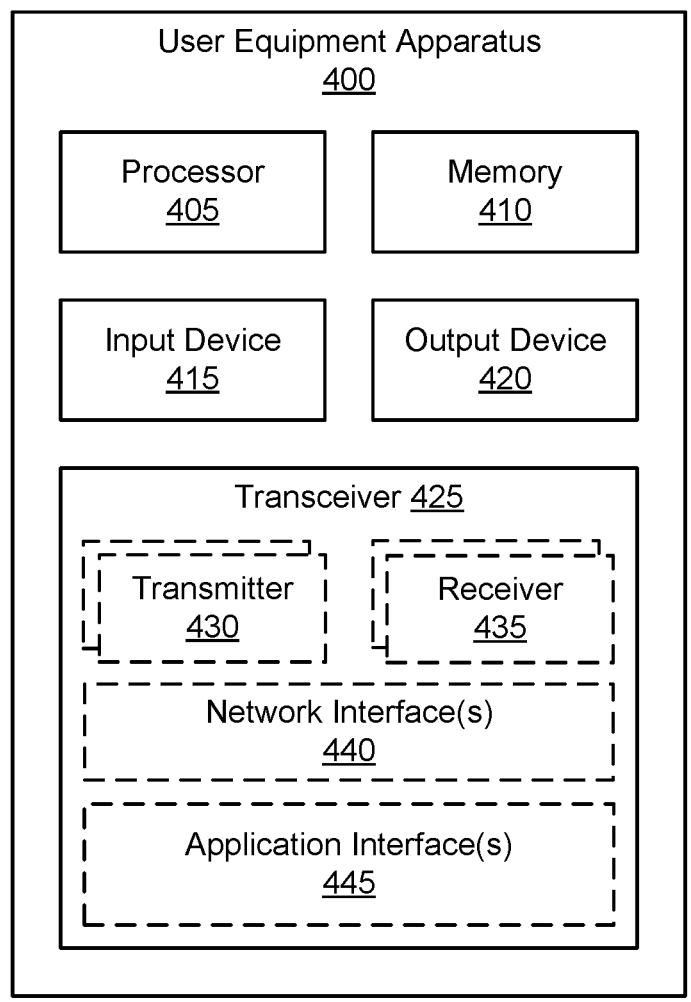
FIG. 4 is a diagram illustrating one embodiment of a user equipment apparatus that may be used for SCell Beam Failure recovery.

FIG. 4 depicts a user equipment apparatus 400 that may be used for SCell Beam Failure recovery, according to embodiments of the disclosure. In various embodiments, the user equipment apparatus 400 is used to implement one or more of the solutions described above. The user equipment apparatus 400 may be one embodiment of the remote unit 105 and/or the UE 205, described above. Furthermore, the user equipment apparatus 400 may include a processor 405, a memory 410, an input device 415, an output device 420, and a transceiver 425.

In some embodiments, the input device 415 and the output device 420 are combined into a single device, such as a touchscreen. In certain embodiments, the user equipment apparatus 400 may not include any input device 415 and/or output device 420. In various embodiments, the user equipment apparatus 400 may include one or more of: the processor 405, the memory 410, and the transceiver 425, and may not include the input device 415 and/or the output device 420.

As depicted, the transceiver 425 includes at least one transmitter 430 and at least one receiver 435. Here, the transceiver 425 communicates with one or more cells supported by one or more base units 121, including a PCell and at least one SCell. Additionally, the transceiver 425 may support at least one network interface 440 and/or application interface 445. The application interface(s) 445 may support one or more APIs. The network interface(s) 440 may support 3GPP reference points, such as Uu and PC5. Other network interfaces 440 may be supported, as understood by one of ordinary skill in the art.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 controls the user equipment apparatus 400 to implement the above described UE behaviors. For example, via the transceiver 425, the processor 405 receives a SR configuration from a network entity in a wireless communication network (i.e., from a gNB in a RAN). Here, the SR configuration comprises a set of PUCCH resources, where the SR configuration corresponds to one or more logical channels. In some embodiments, the processor 405 receives a configuration from the network entity indicating that SCell BFR is mapped to the SR configuration.

In some embodiments, receiving the SR configuration includes receiving a BFR SR configuration including a PUCCH resource for a SCell BFRQ and including parameters related to a SCell BFR SR procedure. In one embodiment, the BFR SR configuration is configured on one of: a primary cell and a primary secondary cell (i.e., on a SpCell 123). In another embodiment, the BFR SR configuration is configured on a different SCell (i.e., an SCell configured with the RRC parameter 'PUCCH-Config').

The processor 405 detects that beam failure procedure has been triggered for the SCell. The processor 405 triggers a SR for SCell BFR in response to determining that there are no UL-SCH resources available for a new transmission for the transmission of a beam failure MAC CE. The processor 405 transmits SR on the PUCCH resources of the SR configuration in response to triggering the SR for SCell BFR. In some embodiments, transmitting SR on the PUCCH resources of the SR configuration includes sending a BFR SR using any valid SR PUCCH resources configured for the UE in response to determining that there is no valid PUCCH resource configured for SCell BFR SR. In some embodiments, the processor 405 ignores received UL grants allocating resources on the SCell 125 until successful completion of a BFR procedure 130.

In some embodiments, the processor 405 further determines that an UL resource allocation is available for a new transmission in response to after having transmitted the SR. Here, the UL resource allocation is associated with a HARQ process and controls the transceiver to transmit a beam failure MAC CE on the allocated uplink resource. Note that the UL resource allocation for a new transmission is allocated later in time than the SR transmission. For example, the network entity (i.e., gNB) allocates UL resource in response to receiving SR from UE.

In some embodiments, the processor 405 receives (i.e., via the transceiver 425) a dynamic UL grant that schedules a new transmission for the HARQ process on which the beam failure MAC CE was transmitted. The processor 405 determines that a BFR procedure 130 is successfully completed in response to reception of the dynamic UL grant. In such embodiments, the dynamic UL grant includes DCI addressed to a C-RNTI of the UE, where the dynamic UL grant has an NDI that is toggled as compared to a reference NDI for the HARQ process.

In some embodiments, the processor 405 transmits the beam failure MAC CE for the SCell 125 according to an available dynamic uplink grant in response to determining that there are UL-SCH resources available for a new transmission. In certain embodiments, the processor 405 prevents the beam failure MAC CE from being sent on a semi-persistently scheduled uplink resource (i.e., a NR configured grant).

In some embodiments, the processor 405 retriggers the SR for SCell BFR if a BFR procedure 130 is not successfully completed upon expiry of a SCell BFR timer. In some embodiments, transmitting SR on the PUCCH resources of the SR configuration includes transmitting a BFR SR using SR configuration or PUCCH resources on a SpCell 123, if SR resources are configured on the SpCell 123, the SpCell 123 being one of a primary cell and a primary secondary cell and performing a RACH procedure on the SpCell 123 if SR resources are not configured on the SpCell 123.

In various embodiments, the processor 405 may detect beam failure for the SCell and initiating a Beam Failure Recovery ("BFR") procedure. In certain embodiments, the processor 405 ignores any received UL grant allocating resources on the SCell until successful completion of the BFR. In certain embodiments, the processor 405 controls the transceiver 425 to transmit a BFR MAC CE for the SCell 125 according to an available dynamic UL grant without transmitting a BFR scheduling request. In certain embodiments, the processor 405 uses any valid SR PUCCH resources configured for the apparatus in response to determining that there is no valid PUCCH resource configured for SCell BFR SR. In certain embodiments, the apparatus 400 is configured by the network with a SR configuration to use for sending a SCell BFR SR.

In some embodiments, the processor 405 determines that the BFR procedure 130 is successfully completed upon reception of a dynamic uplink grant scheduling a new transmission for the HARQ process for the SCell 125. In certain embodiments, the processor 405 retriggers a SCell BFR SR upon expiry of a SCell BFR timer. In one embodiment, the processor 405 controls the transceiver 425 to transmit a BFR scheduling request ("SR") using SR configuration or PUCCH resources on a Special Cell ("SpCell") 123 if SR resources are configured on the SpCell 123. In another embodiment, the processor 405 performs a random access ("RACH") procedure on the SpCell 123 if SR resources are not configured on the SpCell 123.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to SCell Beam Failure recovery. For example, the memory 410 may store BFR resource configurations, SR configurations, and the like. In certain embodiments, the memory 410 also stores program code and related data, such as an operating system or other controller algorithms operating on the apparatus 400.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the user equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or to portions of the output device 420 may be integrated with the input device 415. For example, the input device 415 and output device 420 may form a touchscreen or similar touch-sensitive display. In other embodiments, the output device 420 may be located near the input device 415.

The transceiver 425 includes at least transmitter 430 and at least one receiver 435. One or more transmitters 430 may be used to provide UL communication signals to a base unit 121, such as the UL transmissions described herein. Similarly, one or more receivers 435 may be used to receive DL communication signals from the base unit 121, as described herein. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an ASIC, or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
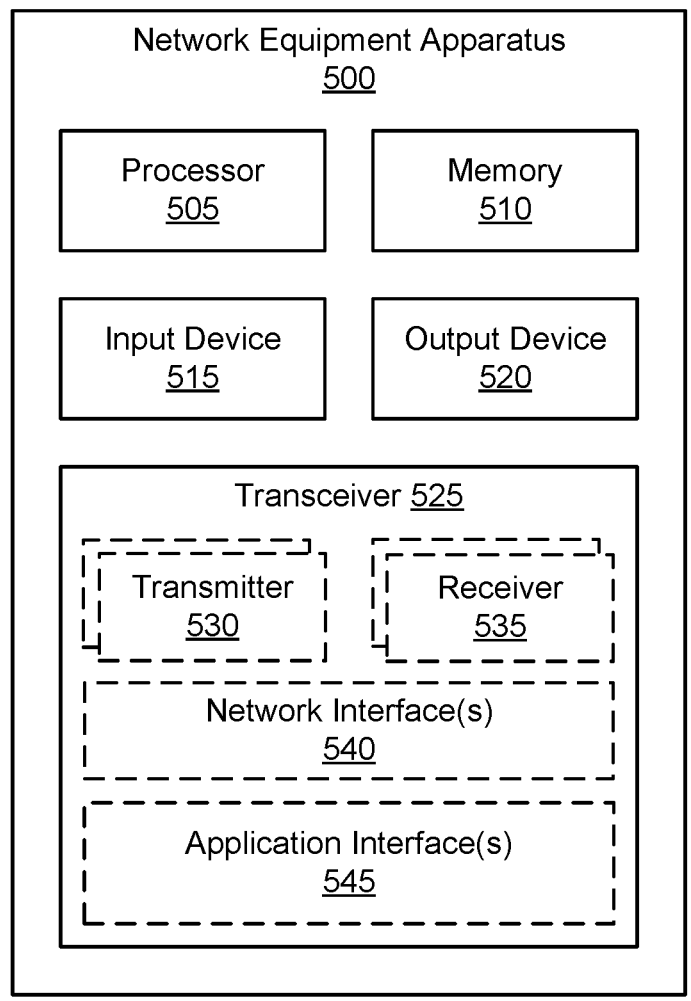
FIG. 5 is a diagram illustrating one embodiment of a network equipment apparatus that may be used for SCell Beam Failure recovery.

FIG. 5 depicts one embodiment of a network equipment apparatus 500 that may be used for SCell Beam Failure recovery, according to embodiments of the disclosure. In some embodiments, the network apparatus 500 may be one embodiment of a RAN node and its supporting hardware, such as the base unit 121, RAN node 211 and/or gNB, described above. Furthermore, network equipment apparatus 500 may include a processor 505, a memory 510, an input device 515, an output device 520, and a transceiver 525. In certain embodiments, the network equipment apparatus 500 does not include any input device 515 and/or output device 520.

As depicted, the transceiver 525 includes at least one transmitter 530 and at least one receiver 535. Here, the transceiver 525 communicates with one or more remote units 105. Additionally, the transceiver 525 may support at least one network interface 540 and/or application interface 545. The application interface(s) 545 may support one or more APIs. The network interface(s) 540 may support 3GPP reference points, such as Uu, N1, N2 and N3. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the network equipment apparatus 500 to implement the above described RAN node behaviors. For example, the processor 505 may support one or more serving cells that serve a UE, including a PCell and/or SCell. In various embodiments, the transceiver 525 may receive a BFRQ, as described herein. Moreover, the processor 505 may allocate UL-SCH resources to a UE, as described herein.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to SCell Beam Failure recovery, for example storing UE identities, BFR resource configurations, SR configurations, resource grants, and the like. In certain embodiments, the memory 510 also stores program code and related data, such as an operating system ("OS") or other controller algorithms operating on the network equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 may communicate with one or more remote units and/or with one or more network functions that provide access to one or more PLMNs. The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like. In one embodiment, the transceiver 525 implements multiple logical transceivers using different communication protocols or protocol stacks, while using common physical hardware.

Figure 6:
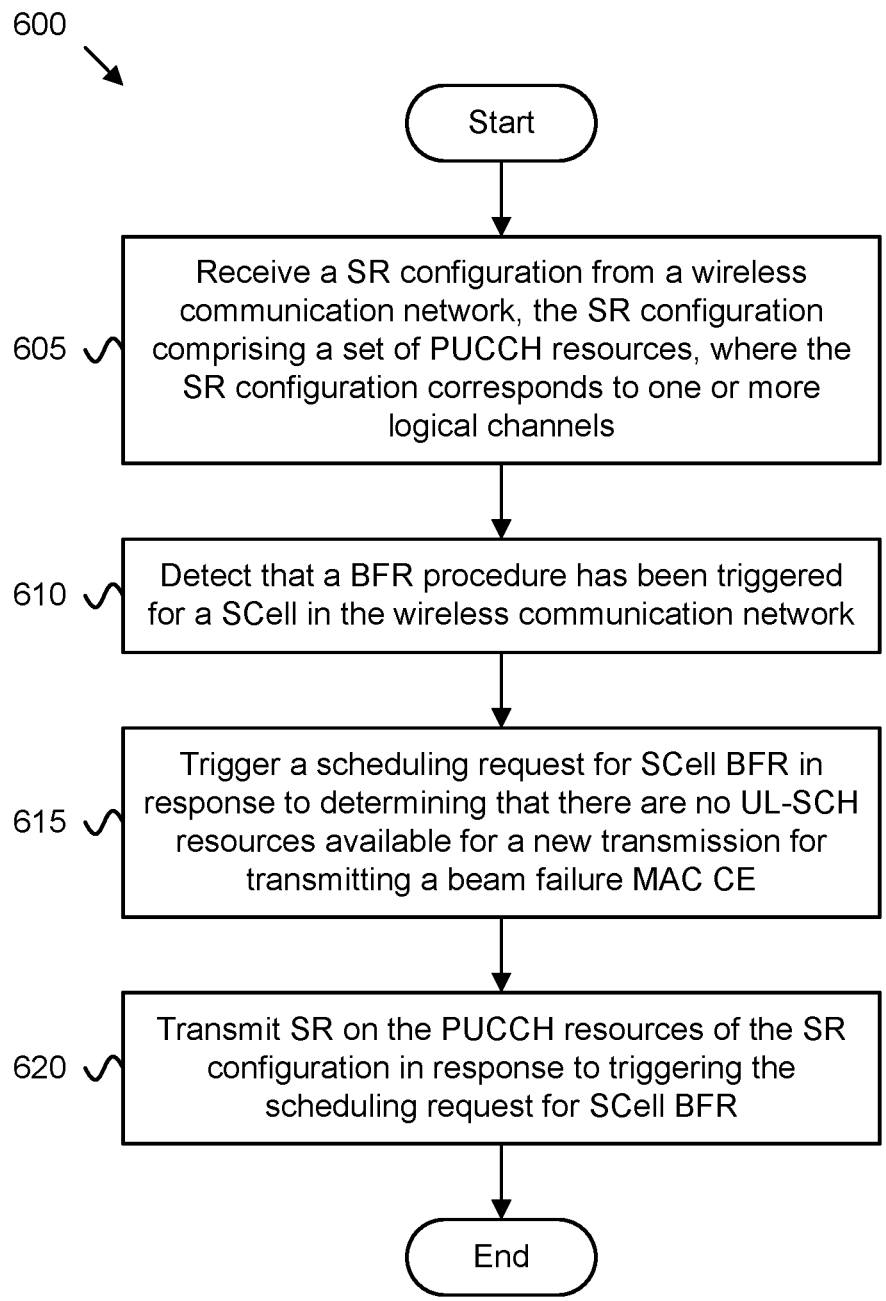
FIG. 6 is a flowchart diagram illustrating one embodiment of a first method that may be used SCell Beam Failure recovery.

FIG. 6 depicts one embodiment of a method 600 for SCell Beam Failure recovery, according to embodiments of the disclosure. In various embodiments, the method 600 is performed by a UE, such as the remote unit 105, the UE 205, and/or the user equipment apparatus 400, described above. In some embodiments, the method 600 is performed by a processor, such as a microcontroller, a microprocessor, a CPU, a GPU, an auxiliary processing unit, a FPGA, or the like.

The method 600 begins and receives 605 a SR configuration from a wireless communication network. Here, the SR configuration comprising a set of PUCCH resources, where the SR configuration corresponds to one or more logical channels. The method 600 includes detecting 610 that a beam failure recovery procedure has been triggered for a SCell in the wireless communication network. The method 600 includes triggering 615 a SR for SCell beam failure recovery in response to determining that there are no UL-SCH resources available for a new transmission for the transmission of a beam failure MAC CE. The method 600 includes transmitting 620 SR on the PUCCH resources of the SR configuration in response to triggering the SR for SCell beam failure recovery. The method 600 ends.

Disclosed herein is a first apparatus for SCell Beam Failure recovery, according to embodiments of the disclosure. The first apparatus may be implemented by a UE, such as the remote unit 105, the UE 205 and/or the user equipment apparatus 400, described above. The first apparatus includes a transceiver that communicates with a SCell in a wireless communication network. The first apparatus includes a processor that receives a SR configuration from a wireless communication network, the SR configuration comprising a set of PUCCH resources, where the SR configuration corresponds to one or more logical channels. The processor detects that beam failure procedure has been triggered for the SCell. The processor triggers a scheduling request for SCell beam failure recovery in response to determining that there are no UL-SCH resources available for a new transmission for the transmission of a beam failure MAC CE. The processor transmits SR on the PUCCH resources of the SR configuration in response to triggering the scheduling request for SCell beam failure recovery.

In some embodiments, the processor receives a configuration from the wireless communication network indicating that SCell beam failure recovery is mapped to the SR configuration. In some embodiments, the processor further determines that an UL resource allocation is available for a new transmission in response to the transmission of the scheduling request. Here, the UL resource allocation is associated with a HARQ process and controls the transceiver to transmit a beam failure MAC CE on the allocated uplink resource.

In some embodiments, the processor receives (i.e., via the transceiver) a dynamic UL grant that schedules a new transmission for the HARQ process on which the beam failure MAC CE was transmitted. The processor determines that a beam failure recovery procedure is successfully completed in response to reception of the dynamic UL grant. In such embodiments, the dynamic UL grant includes DCI addressed to a C-RNTI of the UE, where the dynamic UL grant has an NDI that is toggled as compared to a reference NDI for the HARQ process.

In some embodiments, receiving the SR configuration includes receiving a beam failure recovery SR configuration including a PUCCH resource for a SCell BFRQ and including parameters related to a SCell beam failure recovery SR procedure. In one embodiment, the beam failure recovery SR configuration is configured on one of: a primary cell and a primary secondary cell (i.e., on a SpCell 123). In another embodiment, the beam failure recovery SR configuration is configured on a different SCell (i.e., an SCell configured with the RRC parameter 'PUCCH-Config').

In some embodiments, transmitting SR on the PUCCH resources of the SR configuration includes sending a beam failure recovery SR using any valid SR PUCCH resources configured for the UE in response to determining that there is no valid PUCCH resource configured for SCell beam failure recovery SR. In some embodiments, the processor ignores received UL grants allocating resources on the SCell until successful completion of a beam failure recovery procedure.

In some embodiments, the processor transmits the beam failure MAC CE for the SCell according to an available dynamic uplink grant in response to determining that there are UL-SCH resources available for a new transmission. In certain embodiments, the processor prevents the beam failure MAC CE from being sent on a semi-persistently scheduled uplink resource (i.e., a NR configured grant).

In some embodiments, the processor retriggers the SR for SCell beam failure recovery if a beam failure recovery procedure is not successfully completed upon expiry of a SCell beam failure recovery timer. In some embodiments, transmitting SR on the PUCCH resources of the SR configuration includes transmitting a beam failure recovery scheduling request using SR configuration or PUCCH resources on a SpCell 123, if SR resources are configured on the SpCell 123, the SpCell 123 being one of a primary cell and a primary secondary cell and performing a RACH procedure on the SpCell 123 if SR resources are not configured on the SpCell 123.

Disclosed herein is a first method for SCell Beam Failure recovery, according to embodiments of the disclosure. The first method may be performed by a UE, such as the remote unit 105, the UE 205 and/or the user equipment apparatus 400, described above. The first method includes receiving a SR configuration from a wireless communication network, the SR configuration comprising a set of PUCCH resources, wherein the SR configuration corresponds to one or more logical channels. The first method includes detecting that a BFR procedure 130 has been triggered for a SCell 125 in the wireless communication network. The first method includes triggering a scheduling request for SCell BFR in response to determining that there are no UL-SCH resources available for a new transmission for the transmission of a beam failure MAC CE and transmitting SR on the PUCCH resources of the SR configuration in response to triggering the scheduling request for SCell beam failure recovery.

In some embodiments, the first method includes receiving a configuration from the wireless communication network indicating that SCell beam failure recovery is mapped to the SR configuration. In some embodiments, the first method includes determining that an UL resource allocation is available for a new transmission in response to the transmission of the scheduling request. Here, the UL resource allocation is associated with a HARQ process and transmitting a beam failure MAC CE on the allocated uplink resource.

In certain embodiments, the first method further includes receiving a dynamic UL grant that schedules a new transmission for the HARQ process on which the beam failure MAC CE was transmitted and determining that a beam failure recovery procedure is successfully completed in response to reception of the dynamic UL grant. In such embodiments, the dynamic UL grant may include DCI addressed to a C-RNTI of the UE, wherein the dynamic UL grant has an NDI that is toggled (i.e., as compared to a reference NDI for the HARQ process).

In some embodiments, receiving the SR configuration comprises receiving a BFR SR configuration including a PUCCH resource for a SCell BFRQ and including parameters related to a SCell BFR SR procedure. In one embodiment, the BFR SR configuration is configured on one of a primary cell and a primary secondary cell (i.e., on a SpCell 123). In another embodiment, the BFR SR configuration is configured on a different SCell (i.e., an SCell configured with the RRC parameter 'PUCCH-Config').

In some embodiments, transmitting SR on the PUCCH resources of the SR configuration comprises sending a beam failure recovery SR using any valid SR PUCCH resources configured for the UE in response to determining that there is no valid PUCCH resource configured for SCell beam failure recovery SR. In some embodiments, the first method includes ignoring received UL grants allocating resources on the SCell until successful completion of a beam failure recovery procedure.

In some embodiments, the first method includes transmitting the beam failure MAC CE for the SCell according to an available dynamic uplink grant in response to determining that there are UL-SCH resources available for a new transmission. In certain embodiments, the first method also includes preventing the beam failure MAC CE from being sent on a semi-persistently scheduled uplink resource (i.e., configured grant). In some embodiments, the first method includes retriggering the SR for SCell beam failure recovery if a beam failure recovery procedure is not successfully completed upon expiry of a SCell beam failure recovery timer.

In some embodiments, transmitting SR on the PUCCH resources of the SR configuration includes transmitting a beam failure recovery scheduling request using SR configuration or PUCCH resources on a SpCell 123, if SR resources are configured on the SpCell 123, the SpCell 123 being one of a primary cell and a primary secondary cell and performing a RACH procedure on the SpCell 123, if SR resources are not configured on the SpCell 123.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment ("UE") comprising:
receiving a scheduling request ("SR") configuration comprising a set of Physical Uplink Control Channel ("PUCCH") resources, wherein the SR configuration corresponds to one or more logical channels;
detecting that a beam failure recovery procedure has been triggered for a secondary cell ("SCell");
triggering an SR for a SCell beam failure recovery in response to unavailable Uplink Shared Channel ("UL-SCH") resources for a new transmission of a beam failure recovery Medium Access Control ("MAC") control element ("MAC-CE"); and
transmitting the SR on a PUCCH resource of the SR configuration in response to triggering the SR for the SCell beam failure recovery.

2. The method of claim 1, further comprising:
receiving an indication indicating a mapping of the SCell beam failure recovery to the SR configuration.

3. The method of claim 1, further comprising:
determining an uplink ("UL") resource for the beam failure recovery MAC-CE in response to the transmitted SR, wherein the UL resource is associated with a Hybrid Automatic Repeat Request ("HARQ") process; and
transmitting the beam failure recovery MAC-CE on the UL resource.

4. The method of claim 3, further comprising:
receiving an UL grant for a HARQ transmission associated with the HARQ process and the beam failure recovery MAC-CE; and
determining that the beam failure recovery procedure is successfully completed based at least in part on the UL grant.

5. The method of claim 4, wherein receiving the UL grant comprises receiving a downlink control information ("DCI") addressed to a cell-specific radio network temporary identifier ("C-RNTI") of the UE, and wherein the UL grant comprises a new data indicator ("NDI") that is toggled as compared to a reference NDI for the HARQ process.

6. The method of claim 1, wherein receiving the SR configuration comprises receiving a beam failure recovery SR configuration including a PUCCH resource for a SCell beam failure recovery request ("BFRQ") and one or more parameters associated with a SCell beam failure recovery SR procedure.

7. The method of claim 6, wherein the beam failure recovery SR configuration is for a primary cell or a primary secondary cell.

8. The method of claim 6, wherein the beam failure recovery SR configuration is configured on a respective SCell different that the SCell associated with the beam failure recovery procedure.

9. The method of claim 1, wherein transmitting the SR on the PUCCH resource of the SR configuration comprises transmitting a beam failure recovery SR using one or more valid SR PUCCH resources configured for the UE.

10. The method of claim 1, further comprising:
ignoring one or more uplink ("UL") grants allocating one or more resources associated with the SCell until a successful completion of the beam failure recovery procedure.

11. The method of claim 1, further comprising:
transmitting the beam failure recovery MAC-CE according to an uplink grant in response to one or more unavailable UL-SCH resources available for the new transmission of the beam failure recovery MAC-CE.

12. The method of claim 1, further comprising:
refraining from transmitting the beam failure recovery MAC-CE on a semi-persistently scheduled uplink ("UL") resource.

13. The method of claim 1, further comprising:
retriggering the SR for the SCell beam failure recovery based on the beam failure recovery procedure being unsuccessful and an expiration of a timer.

14. The method of claim 1, wherein transmitting the SR on the PUCCH resource of the SR configuration comprises:
transmitting a beam failure recovery SR using the SR configuration or one or more PUCCH resources of a Special Cell ("SpCell") based on SR resources being configured on the SpCell, the SpCell comprising a primary cell or a primary secondary cell; and
performing a random access ("RACH") procedure on the SpCell based on the SR resources not being configured on the SpCell.

15. A user equipment ("UE") for wireless communication, comprising:
at least one memory; and
at least one processor coupled with the at least one memory and configured to cause the UE to:
receive a scheduling request ("SR") configuration comprising a set of Physical Uplink Control Channel ("PUCCH") resources, wherein the SR configuration corresponds to one or more logical channels;
detect that beam failure procedure has been triggered for a secondary cell ("SCell");
trigger an SR for a SCell beam failure recovery in response to unavailable Uplink Shared Channel ("UL-SCH") resources available for a new transmission for the transmission of a beam failure recovery Medium Access Control ("MAC") control element ("MAC-CE"); and
transmit the SR on a PUCCH resource of the SR configuration in response to triggering the SR for the SCell beam failure recovery.

16. The UE of claim 15, wherein the at least one processor is configured to cause the UE to receive an indication indicating a mapping of the SCell beam failure recovery to the SR configuration.

17. The UE of claim 15, wherein the at least one processor is configured to cause the UE to:
determine that an uplink ("UL") resource for the beam failure recovery MAC-CE in response to the transmitted SR, wherein the UL resource is associated with a Hybrid Automatic Repeat Request ("HARQ") process; and
transmit the beam failure recovery MAC-CE on the UL resource.

18. The UE of claim 17, wherein the at least one processor is configured to cause the UE to:
receives an UL grant for a HARQ transmission associated with the HARQ process and the beam failure recovery MAC-CE; and
determines that the beam failure recovery procedure is successfully completed based at least in part on the UL grant.

19. The UE of claim 18, wherein to receive the UL grant, the at least one processor is configured to cause the UE to receive a downlink control information ("DCI") addressed to a cell-specific radio network temporary identifier ("C-RNTI") of the UE, and wherein the UL grant comprises a new data indicator ("NDI") that is toggled as compared to a reference NDI for the HARQ process.

20. The UE of claim 15, wherein, to receive the SR configuration, the at least one processor is configured to cause the UE to receive a beam failure recovery SR configuration including a PUCCH resource for a SCell beam failure recovery request ("BFRQ") and one or more parameters associated with a SCell beam failure recovery SR procedure.

* * * * *